(12) United States Patent
Kanazawa

(10) Patent No.: US 9,189,118 B2
(45) Date of Patent: Nov. 17, 2015

(54) LINEAR SYSTEM COEFFICIENT ESTIMATION METHOD, INTEGRATED CIRCUIT EMPLOYING SAME, TOUCH PANEL SYSTEM, AND ELECTRONIC APPARATUS

(71) Applicant: Sharp Kabushiki Kaisha, Osaka-shi, Osaka (JP)

(72) Inventor: Yusuke Kanazawa, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/370,889

(22) PCT Filed: Jan. 9, 2013

(86) PCT No.: PCT/JP2013/050246
§ 371 (c)(1),
(2) Date: Jul. 7, 2014

(87) PCT Pub. No.: WO2013/105584
PCT Pub. Date: Jul. 18, 2013

(65) Prior Publication Data
US 2015/0002463 A1    Jan. 1, 2015

(30) Foreign Application Priority Data
Jan. 10, 2012  (JP) ................................ 2012-002600

(51) Int. Cl.
*G06F 3/044* (2006.01)
*G06F 3/041* (2006.01)

(52) U.S. Cl.
CPC .............. *G06F 3/044* (2013.01); *G06F 3/0418* (2013.01)

(58) Field of Classification Search
CPC ....... G06F 3/044; G06F 3/045; G06F 3/0412; G06F 3/0416; G06F 3/046; G06F 3/0488; G01R 27/2605
See application file for complete search history.

(56) References Cited

U.S. PATENT DOCUMENTS

| 8,605,037 B2* | 12/2013 | Philipp | G06F 3/0418 345/173 |
| 2006/0158202 A1 | 7/2006 | Umeda et al. | |
| 2011/0043478 A1 | 2/2011 | Matsushima | |
| 2011/0115729 A1* | 5/2011 | Kremin | G06F 3/0418 345/173 |
| 2011/0242048 A1* | 10/2011 | Guedon | G06F 3/044 345/174 |
| 2012/0200524 A1* | 8/2012 | Vallis | G06F 3/044 345/174 |

FOREIGN PATENT DOCUMENTS

| JP | 2005-152223 A | 6/2005 |
| JP | 2011-117385 A | 6/2011 |
| WO | WO 2005/091677 A1 | 9/2005 |
| WO | WO 2009/107415 A1 | 9/2009 |

* cited by examiner

*Primary Examiner* — Kevin M Nguyen
(74) *Attorney, Agent, or Firm* — Birch, Stewart, Kolasch & Birch, LLP

(57) ABSTRACT

A noise removing section (101) is provided which removes noise superimposed on each of N linear sum signals of target coefficients by filtering the N linear sum signals. An estimating section (105) estimates values of the M target coefficients by calculating an inner product of (i) signals which vary in accordance with the N linear sum signals from each of which the noise has been removed and (ii) N M-dimensional vectors.

4 Claims, 14 Drawing Sheets

F I G. 1
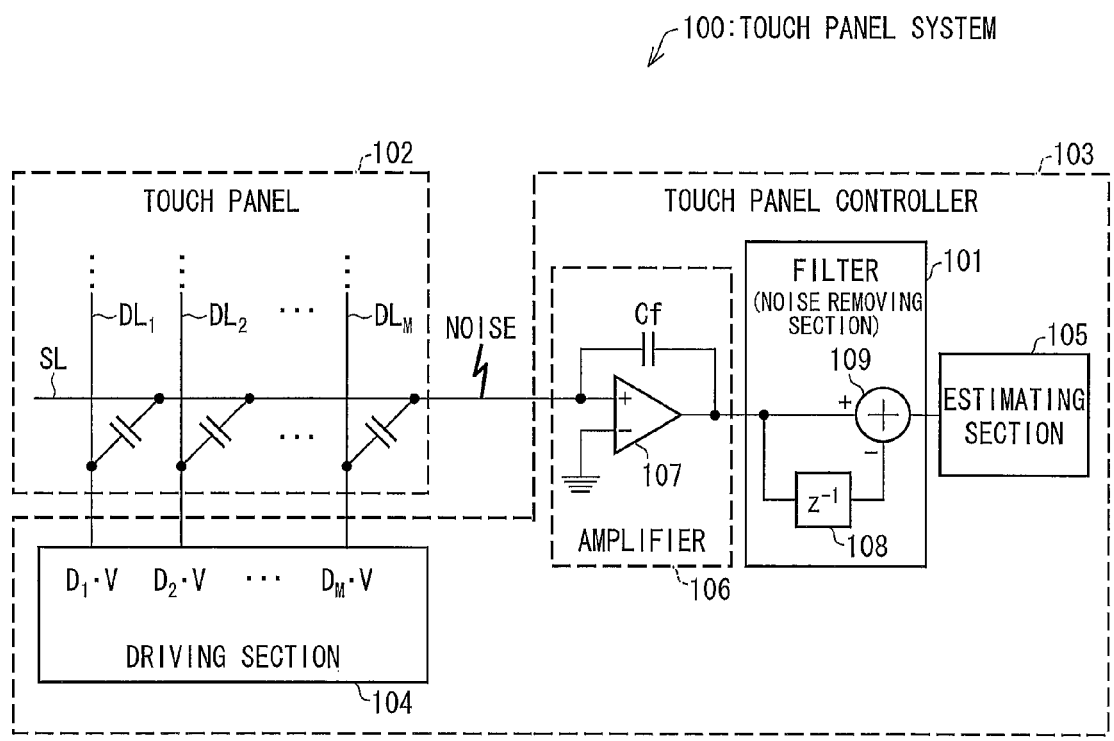

F I G. 2

| j | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| SEQUENCE $E_{1,j}$ | 1 | -1 | 1 | 1 | -1 | -1 | 1 | -1 | -1 | -1 | 1 | 1 | 1 | 1 | -1 |
| SEQUENCE $E_{2,j}$ | -1 | 1 | 1 | -1 | -1 | 1 | -1 | -1 | -1 | 1 | 1 | 1 | 1 | -1 | 1 |
| SEQUENCE $E_{3,j}$ | 1 | 1 | -1 | -1 | 1 | -1 | -1 | -1 | 1 | 1 | 1 | 1 | -1 | 1 | -1 |
| SEQUENCE $E_{4,j}$ | 1 | -1 | -1 | 1 | -1 | -1 | -1 | 1 | 1 | 1 | 1 | -1 | 1 | -1 | 1 |
| SEQUENCE $E_{5,j}$ | -1 | -1 | 1 | -1 | -1 | -1 | 1 | 1 | 1 | 1 | -1 | 1 | -1 | 1 | 1 |
| SEQUENCE $E_{6,j}$ | -1 | 1 | -1 | -1 | -1 | 1 | 1 | 1 | 1 | -1 | 1 | -1 | 1 | 1 | -1 |
| SEQUENCE $E_{7,j}$ | 1 | -1 | -1 | -1 | 1 | 1 | 1 | 1 | -1 | 1 | -1 | 1 | 1 | -1 | -1 |
| SEQUENCE $E_{8,j}$ | -1 | -1 | -1 | 1 | 1 | 1 | 1 | -1 | 1 | -1 | 1 | 1 | -1 | -1 | 1 |
| SEQUENCE $E_{9,j}$ | -1 | -1 | 1 | 1 | 1 | 1 | -1 | 1 | -1 | 1 | 1 | -1 | -1 | 1 | -1 |
| SEQUENCE $E_{10,j}$ | -1 | 1 | 1 | 1 | 1 | -1 | 1 | -1 | 1 | 1 | -1 | -1 | 1 | -1 | -1 |
| SEQUENCE $E_{11,j}$ | 1 | 1 | 1 | 1 | -1 | 1 | -1 | 1 | 1 | -1 | -1 | 1 | -1 | -1 | -1 |
| SEQUENCE $E_{12,j}$ | 1 | 1 | 1 | -1 | 1 | -1 | 1 | 1 | -1 | -1 | 1 | -1 | -1 | -1 | 1 |
| SEQUENCE $E_{13,j}$ | 1 | 1 | -1 | 1 | -1 | 1 | 1 | -1 | -1 | 1 | -1 | -1 | -1 | 1 | 1 |
| SEQUENCE $E_{14,j}$ | 1 | -1 | 1 | -1 | 1 | 1 | -1 | -1 | 1 | -1 | -1 | -1 | 1 | 1 | 1 |
| SEQUENCE $E_{15,j}$ | -1 | 1 | -1 | 1 | 1 | -1 | -1 | 1 | -1 | -1 | -1 | 1 | 1 | 1 | 1 |

MC

F I G. 8
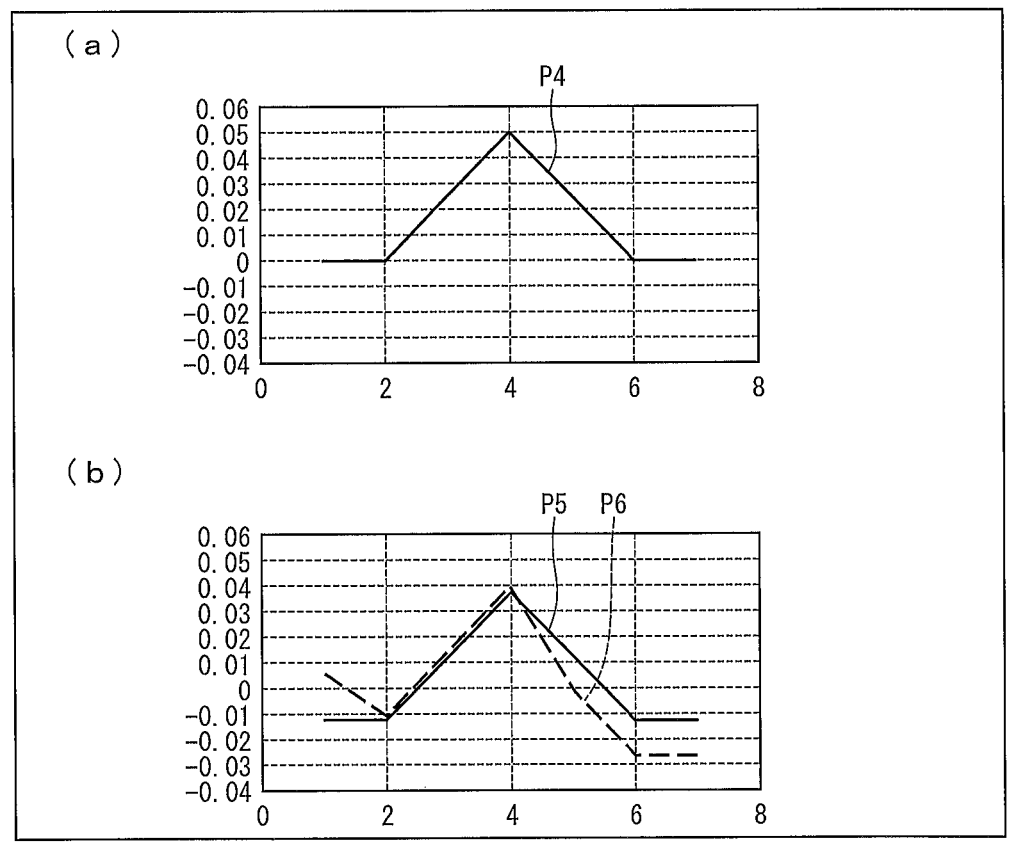

F I G. 1 0
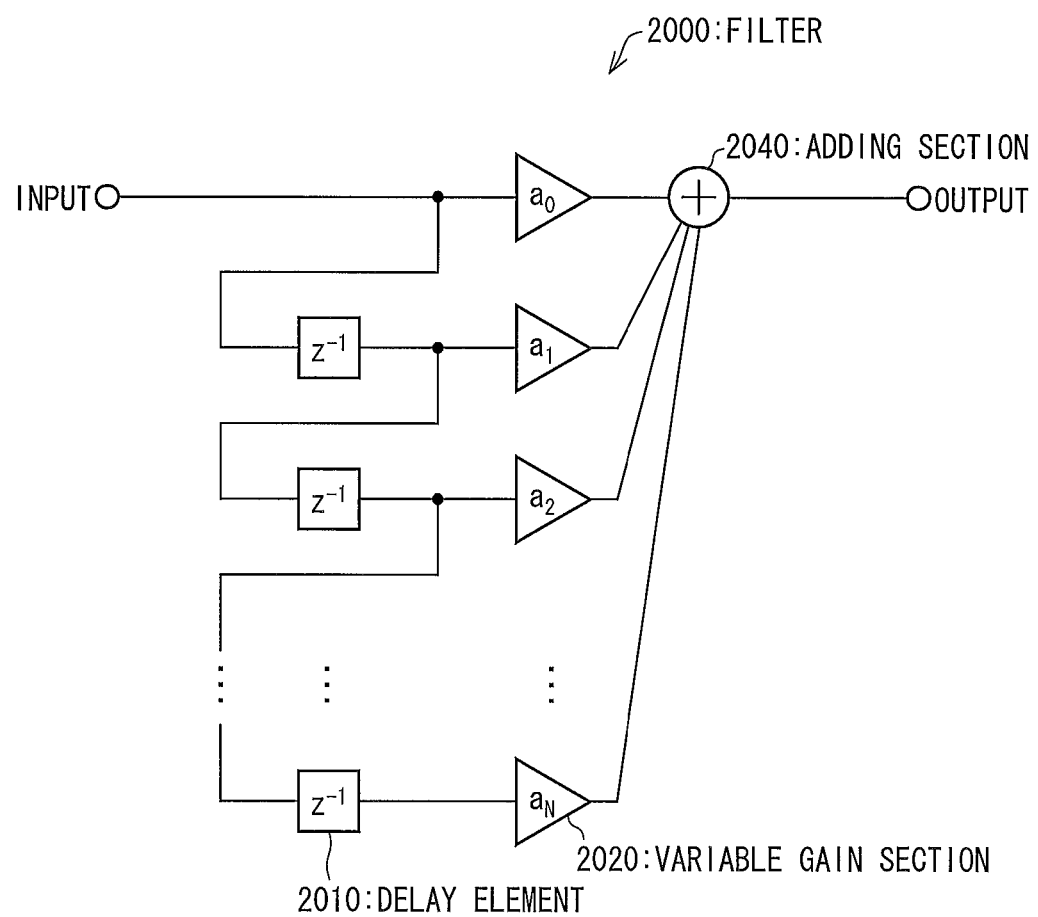

F I G. 1 4

$$1^{st} \text{ vector} \quad \frac{(C_{31})VDD}{C_{int}} \quad \cdots \text{(EXPRESSION 1)}$$

$$2^{nd} \text{ vector} \quad \frac{(C_{32})VDD}{C_{int}} \quad \cdots \text{(EXPRESSION 2)}$$

$$\begin{bmatrix} 1 & 0 & 0 & 0 \\ 0 & 1 & 0 & 0 \\ 0 & 0 & 1 & 0 \\ 0 & 0 & 0 & 1 \end{bmatrix} \begin{bmatrix} C1 \\ C2 \\ C3 \\ C4 \end{bmatrix} = \begin{bmatrix} Y1 \\ Y2 \\ Y3 \\ Y4 \end{bmatrix} \quad \cdots \text{(EXPRESSION 3)}$$

$$\begin{bmatrix} C1 \\ C2 \\ C3 \\ C4 \end{bmatrix} = \begin{bmatrix} Y1 \\ Y2 \\ Y3 \\ Y4 \end{bmatrix} \quad \cdots \text{(EXPRESSION 4)}$$

LINEAR SYSTEM COEFFICIENT ESTIMATION METHOD, INTEGRATED CIRCUIT EMPLOYING SAME, TOUCH PANEL SYSTEM, AND ELECTRONIC APPARATUS

TECHNICAL FIELD

The present invention relates to a linear system coefficient estimation method for estimating or detecting capacitances of capacitors arranged in a matrix pattern. Further, the present invention relates to an integrated circuit, a touch panel system, and an electronic apparatus, each of which employs the linear system coefficient estimation method.

BACKGROUND ART

As a device which detects capacitances of capacitors arranged in a matrix pattern, Cited Document 1 discloses a capacitance detecting circuit which detects distribution of capacitances of a capacitor matrix in which capacitors are formed between M drive lines and L sense lines. The capacitance detecting circuit, which utilizes the fact that a capacitance of a capacitor located at a touched position becomes small when a finger or a pen touches a touch panel, detects, by detecting a change in capacitance, a position touched by a finger or a pen on the touch panel.

FIG. 13 is a view schematically illustrating a configuration of a conventional touch panel system 900. FIG. 14 is a view for explaining how the touch panel system 900 is driven. The touch panel system 900 includes a touch panel 902 and a touch panel controller 903. The touch panel 902 has (i) drive lines DL1 through DL4, (ii) sense lines SL1 through SL4, and (iii) capacitors C11 through C44 arranged at respective intersections of the drive lines DL1 through DL4 and the sense lines SL1 to SL4. The touch panel controller 903 includes a driving section 904 and amplifiers 908.

The following description will discuss how the touch panel system 900 converts a capacitance into a measured value (detected value).

The driving section 904 drives the drive lines DL1 through DL4 in accordance with a code sequence, having four columns and four rows, expressed by Expression 3 shown in FIG. 14. In a case where an element of the code sequence is "1 (one)", the driving section 904 applies a power-supply voltages VDD to the drive lines DL1 through DL4. In a case where an element of the code sequence is "0 (zero)" the driving section 904 applies no voltage to the drive lines DL1 through DL4.

The touch panel system 900 has four amplifiers 908 arranged so as to correspond to the respective sense lines SL1 to SL4. Each of the amplifiers 908 receives and amplifies linear sums Y1 through Y4 of the capacitors along a corresponding one of the sense lines SL1 through SL4 driven by the driving section 904.

Specifically, out of four times of driving in accordance with the code sequence having four columns and four rows, the driving section 904 applies, during the first time of driving, a power-supply voltage VDD to the drive line DL1, while applying no voltage to the rest drive lines DL2 through DL4. This causes an output corresponding to the capacitor C31, which output is expressed by Expression 1 shown in FIG. 14, to be supplied from, for example, the sense line SL3 to a corresponding one of the amplifiers 908 as a measured value Y1.

During the second time of driving, the driving section 904 applies a power-source voltage VDD to the drive line DL2, while applying no voltage to the rest drive lines DL1, DL3, and DL4. This causes an output corresponding to the capacitor C32, which output is expressed by Expression 2 shown in FIG. 14, to be supplied from the sense line SL3 to the corresponding one of the amplifiers 908 as a measured value Y2.

Similarly, during the third time of driving, the driving section 904 applies a power-source voltage VDD to the drive line DL3, while applying no voltage to the rest drive lines DL1, DL2, and DL4. Thereafter, during the fourth time of driving, the section 904 applies a power-source voltage VDD to the drive line DL4, while applying no voltage to the rest drive lines DL1 through DL3. By the third and the fourth times of driving, measured values Y3 and Y4 corresponding to the capacitors C3 and C4, respectively, are obtained.

In this manner, the measured values Y1, Y2, Y3, and Y4 are associated with capacitances C1, C2, C3, and C4, respectively (see Expressions 3 and 4 shown in FIG. 14).

CITATION LIST

Patent Literature 1

Japanese Patent Application Publication, Tokukai, No. 2005-152223 A (Publication Date: Jun. 16, 2005)

SUMMARY OF INVENTION

Technical Problem

As described above, the touch panel 900 can obtain a measured value (detected value) from a capacitance.

However, the touch panel system 900 can obtain, by one time of measurement, only data of capacitors located at respective intersections of one drive line and sense lines. Therefore, there is a problem that, because a noise component does not become small, it is difficult to accurately detect a change in capacitance of a capacitor.

That is, there is a problem that the conventional touch panel system 900 is easily affected by noise, in other words, the touch panel system 900 has low noise-resistance.

The present invention has been made in view of the above problems, and an object of the present invention is to provide a linear system coefficient estimation method which has high noise-resistance. Further, an object of the present invention is to provide an integrated circuit, a touch panel system, and an electronic apparatus, each of which employs the linear system coefficient estimation method.

Solution to Problem

A linear system coefficient estimation method of the present invention is a linear system coefficient estimation method in which values of M target coefficients are estimated by (i) obtaining N linear sums of the M target coefficients by simultaneously driving the M target coefficients in accordance with N M-dimensional vectors and) calculating an inner product of N linear sum signals, which correspond to the respective N linear sums, of the M target coefficients and the N M-dimensional vectors, the method including the steps of: (a) removing noise superimposed on each of the N linear sum signals of the M target coefficients by filtering the N linear sum signals; and (b) estimating the values of the M target coefficients by calculating the inner product of (i) signals which vary in accordance with the N linear sum signals from each of which the noise has been removed in the step (a) and (ii) the N M-dimensional vectors.

According to the above feature, the noise superimposed on each of the N linear sum signals of the M target coefficients is removed by filtering the N linear sum signals, and the values of the M target coefficients are estimated by calculating the inner product of (i) the signals which vary in accordance with the N linear sum signals from each of which the noise has been removed and (ii) the N M-dimensional vectors.

In this manner, the value of the M target coefficients are estimated after the noise is removed by filtering the N linear sum signals. Therefore, the estimated values of the M target coefficients are not affected by the noise. That is, the linear system coefficient estimation method of the present invention has high noise-resistance.

An integrated circuit of the present invention is an integrated circuit including: a driving section which simultaneously drives M target coefficients in accordance with N M-dimensional vectors; and an estimating section which estimates values of the M target coefficients by (i) obtaining N linear sums of the M target coefficients and (ii) calculating an inner product of N linear sum signals, which correspond to the respective N linear sums, of the M target coefficients and the N M-dime sional vectors, the integrated circuit further including: a noise removing section for removing noise superimposed on each of the N linear sum signals of the M target coefficients by filtering the N linear sum signals, the estimating section estimating the values of the M target coefficients by calculating the inner product of (i) signals which vary in accordance with the N linear sum signals from each of which the noise has been removed by the noise removing section and (ii) the N M-dimensional vectors.

According to the above feature, the noise removing section removes the noise superimposed on each of the N linear sum signals of the M target coefficients by filtering the N linear sum signals, and the estimating section estimates the values of the M target coefficients by calculating the inner product of (i) the signals which vary in accordance with the N linear sum signals from each of which the noise has been removed and (ii) the N M-dimensional vectors.

In this manner, the values of the M target coefficients are estimated after the noise superimposed on each of the N linear sum signals is removed. Therefore, the estimated values of the M target coefficients are not affected by the noise. That is, the integrated circuit of the present invention has high noise-resistance.

A touch panel system of the present invention includes: an integrated circuit of the present invention; and a touch panel which is controlled by the integrated circuit.

According to the above feature, the noise removing section of the integrated circuit included in the touch panel system of the present invention removes the noise superimposed on each of the N linear sum signals of the M target coefficients by filtering the N linear sum signals, and the estimating section of the integrated circuit estimates the values of the M target coefficients by calculating the inner product of (i) the signals which vary in accordance with the N linear sum signals from each of which the noise has been removed and (ii) the N M-dimensional vectors.

In this manner, the values of the M target coefficients are estimated after the noise superimposed on each of the N linear sum signals is removed. Therefore, the estimated values of the M target coefficients are not affected by the noise. That is, the touch panel system of the present invention has high-noise resistance.

An electronic apparatus of the present invention includes: an integrated circuit of the present invention; a touch panel which is controlled by the integrated circuit; and a display panel which is superimposed on the touch panel or which embeds therein the touch panel.

According to the above feature, the noise removing section of the integrated circuit included in the electronic apparatus of the present invention removes the noise superimposed on each of the N linear sum signals of the M target coefficients by filtering the N linear sum signals, and the estimating section of the integrated circuit estimates the values of the M target coefficients by calculating the inner product of (i) the signals which vary in accordance with the N linear sum signals from each of which the noise has been removed and (ii) the N M-dimensional vectors.

In this manner, the values of the M target coefficients are estimated after the noise superimposed on each of the N linear sum signals is removed. Therefore, the estimated values of the M target coefficients are not affected by the noise. That is, the electronic apparatus of the present invention has high-noise resistance.

Advantageous Effects of Invention

As has been described, a linear system coefficient estimation method of the present invention includes the steps of: (a) removing noise superimposed on each of N linear sum signals of M target coefficients by filtering the N linear sum signals; and (b) estimating values of the M target coefficients by calculating an inner product of (i) signals which vary in accordance with the N linear sum signals from each of which the noise has been removed in the step (a) and (ii) N M-dimensional vectors.

This makes it possible to provide a linear system coefficient estimation method which has high noise-resistance.

BRIEF DESCRIPTION OF DRAWINGS

FIG. 1 is a view schematically illustrating a configuration of a touch panel system of the present invention.

FIG. 2 is a view illustrating a specific example of an M-sequence whose code length is 15.

Figure 3:
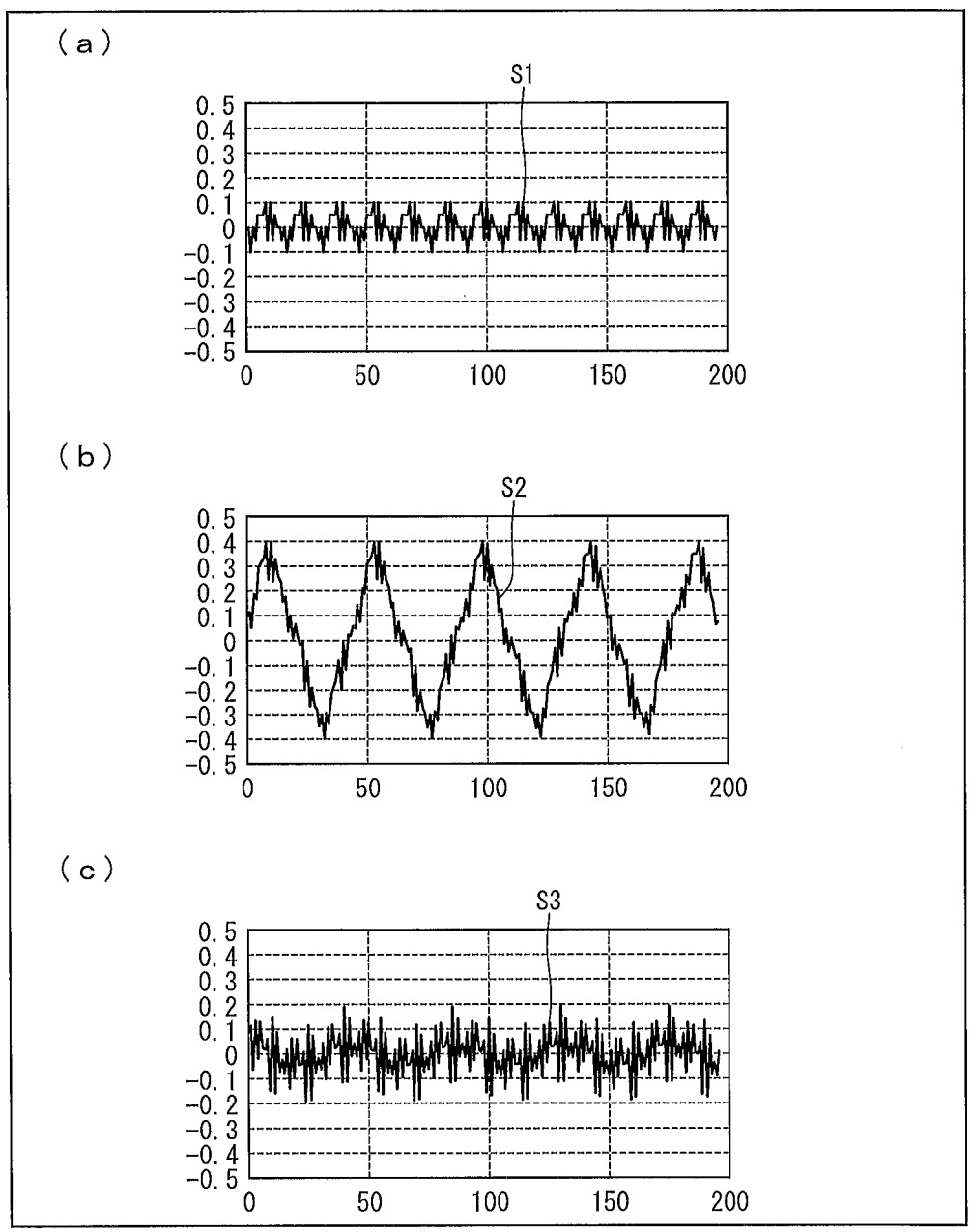

(a) of FIG. 3 is a view illustrating a linear sum signal to which noise has not yet been applied. (b) of FIG. 3 is a view illustrating the linear sum signal to which noise has been applied. (c) of FIG. 3 is a view illustrating an output signal of a filter.

Figure 4:
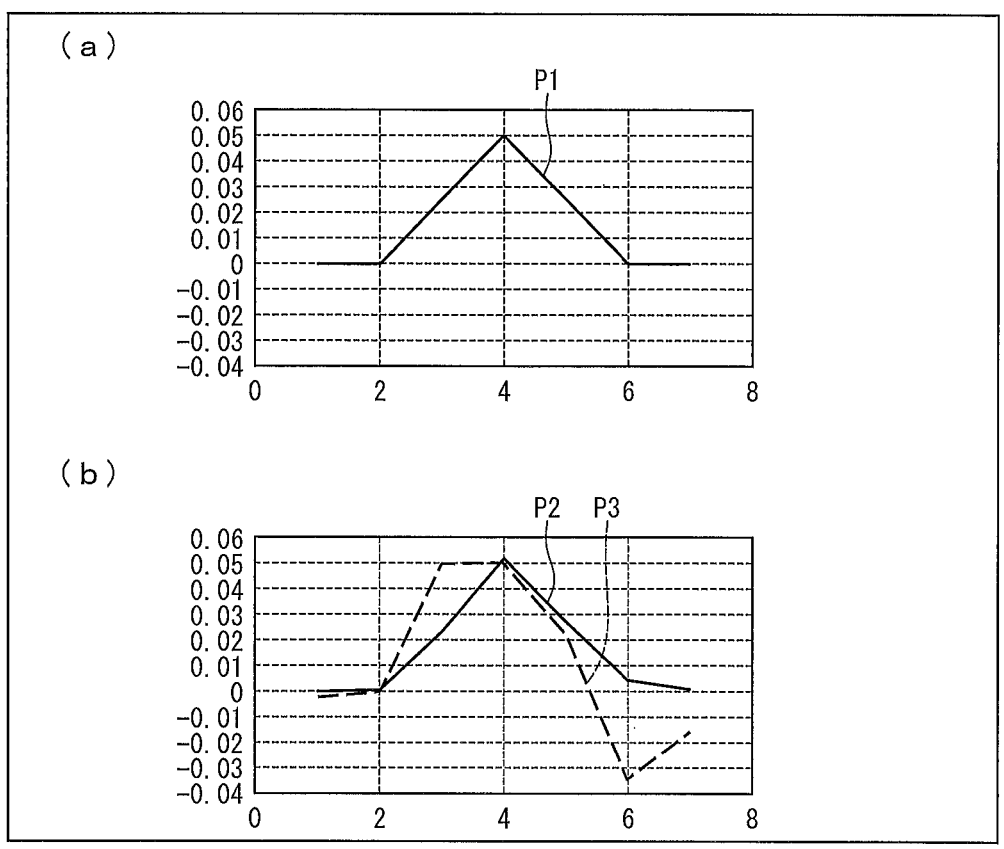

(a) of FIG. 4 is a view illustrating a linear sum signal to which noise has not yet been applied. (b) of FIG. 4 is a view illustrating the linear sum signal to which noise whose characteristic has been changed has been applied. (c) of FIG. 4 is a view illustrating a signal obtained by filtering the linear sum signal, to which the noise has been applied, with the use of a filter which is not an adaptive filter.

Figure 5:
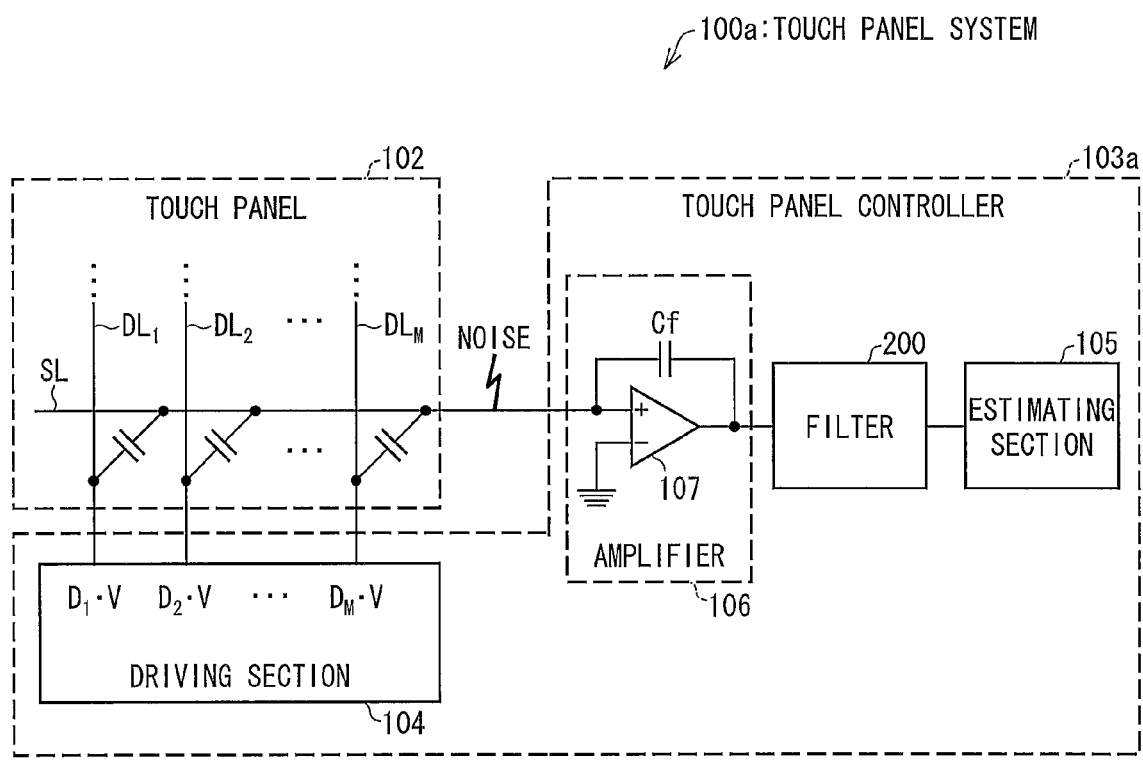

FIG. 5 is a view schematically illustrating a configuration of a touch panel system of the present invention, which touch panel system includes a filter.

Figure 6:
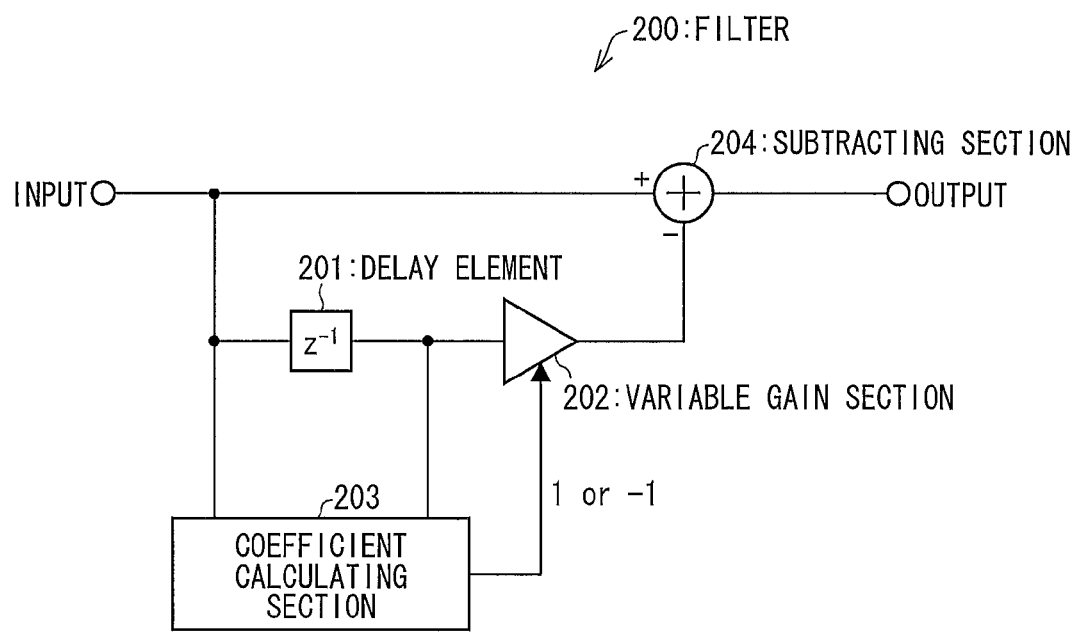

FIG. 6 is a view schematically illustrating a configuration of the filter employed for the touch panel system of the present invention.

Figure 7:
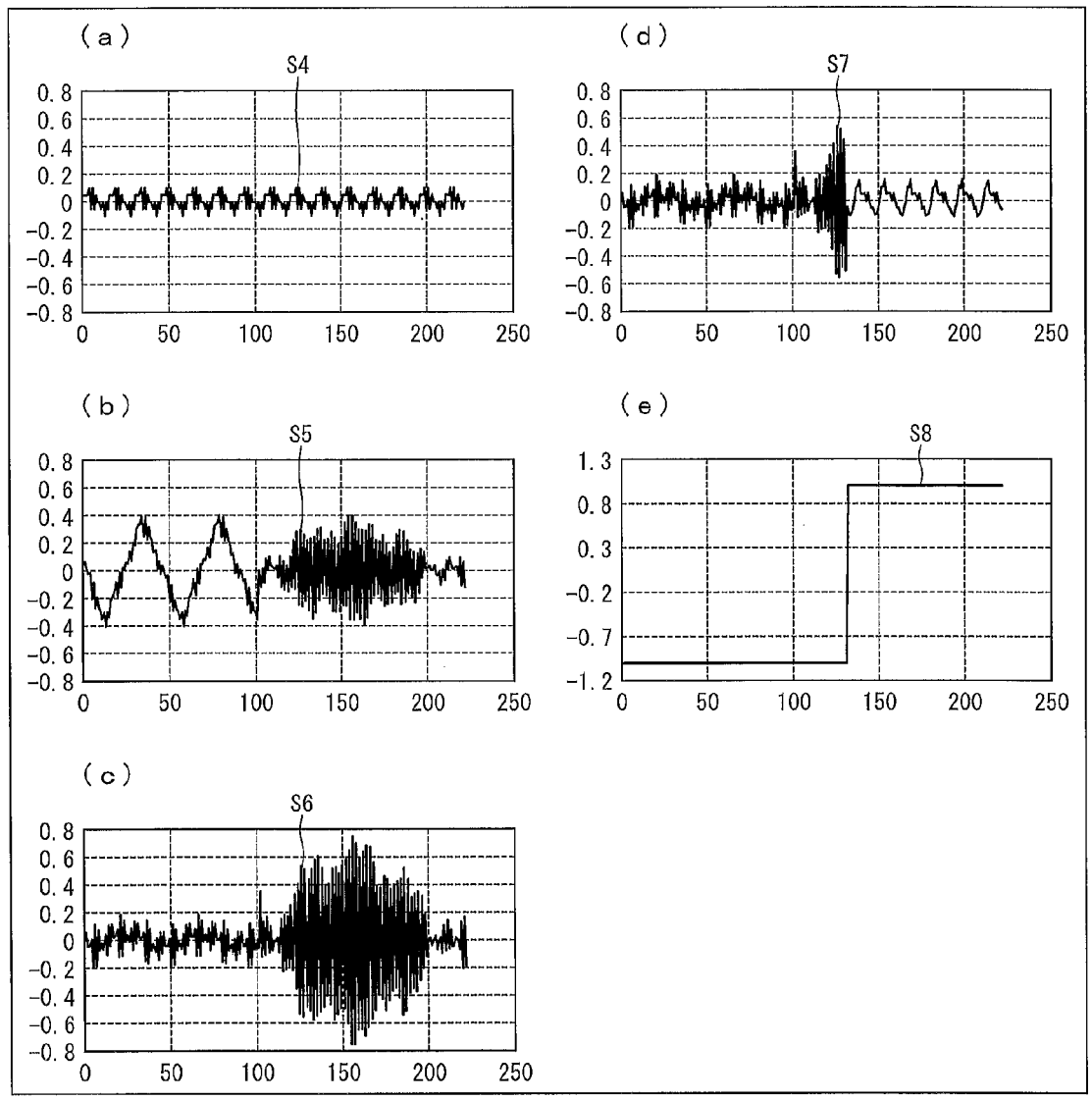

(a) of FIG. 7 is a view illustrating a linear sum signal to which noise whose characteristic has been changed has not yet been applied. (b) of FIG. 7 is a view illustrating the linear sum signal to which noise whose characteristic has been changed has been applied. (c) of FIG. 7 is a view illustrating a signal obtained by filtering the linear sum signal, to which the noise has been applied, with the use of a noise filter whose coefficient cannot be changed. (d) of FIG. 7 is a view illustrating a signal obtained by filtering the signal, to which the noise has been applied, with the use of a filter. (e) of FIG. 7 is a view illustrating an output signal of a coefficient calculating section.

(a) of FIG. 8 is a view illustrating a capacitance pattern which is supplied to a filter capable of changing a coefficient. (b) of FIG. 8 is a view illustrating a capacitance pattern estimated by the filter from the capacitance pattern.

Figure 9:
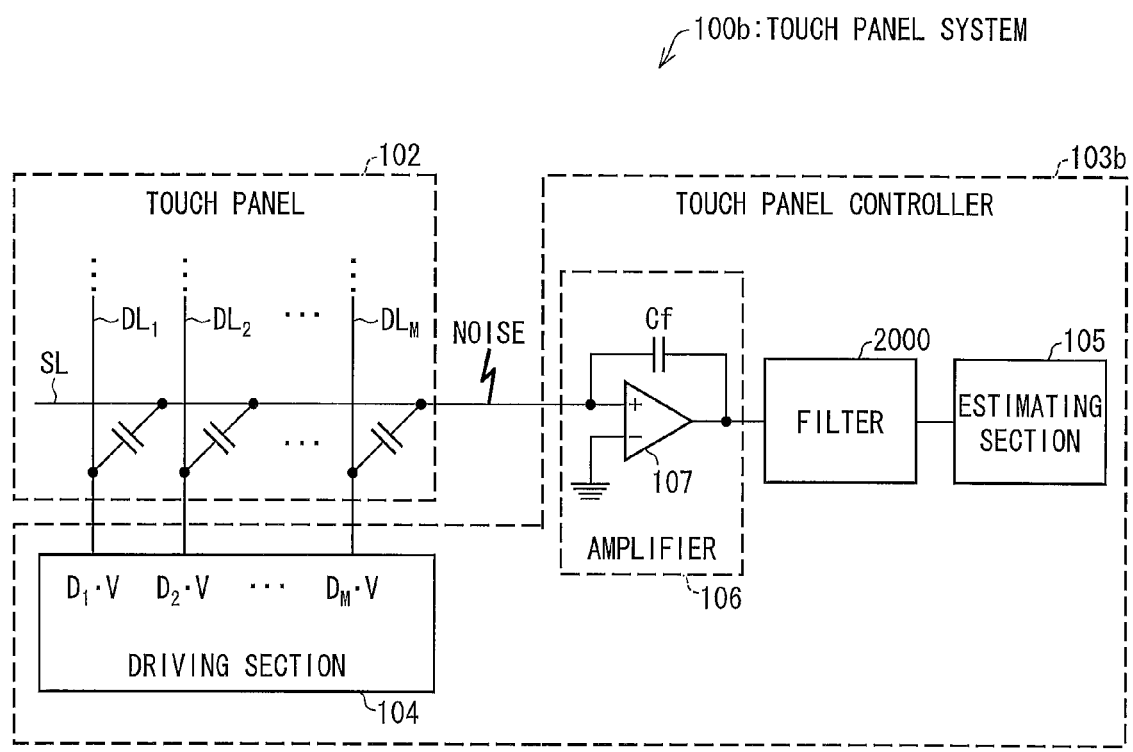

FIG. 9 is a view schematically illustrating a configuration of a touch panel system of the present invention, which touch panel system employs other filter capable of changing a coefficient.

FIG. 10 is a view schematically illustrating a configuration of the filter capable of changing a coefficient, which filter is employed for the touch panel system of the present invention.

Figure 11:
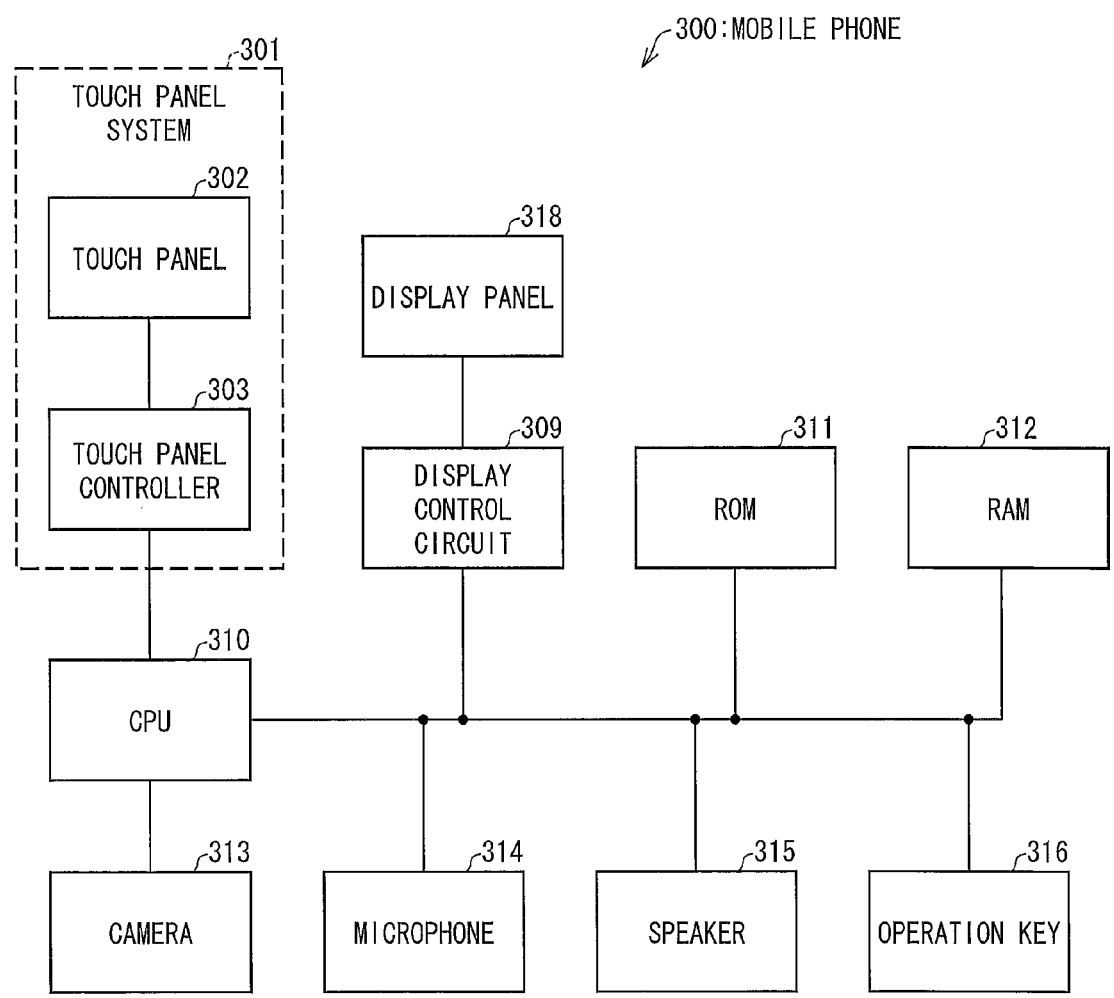

FIG. 11 is a functional block diagram illustrating a configuration of a mobile phone in accordance with an example of an electronic apparatus of the present invention.

Figure 12:
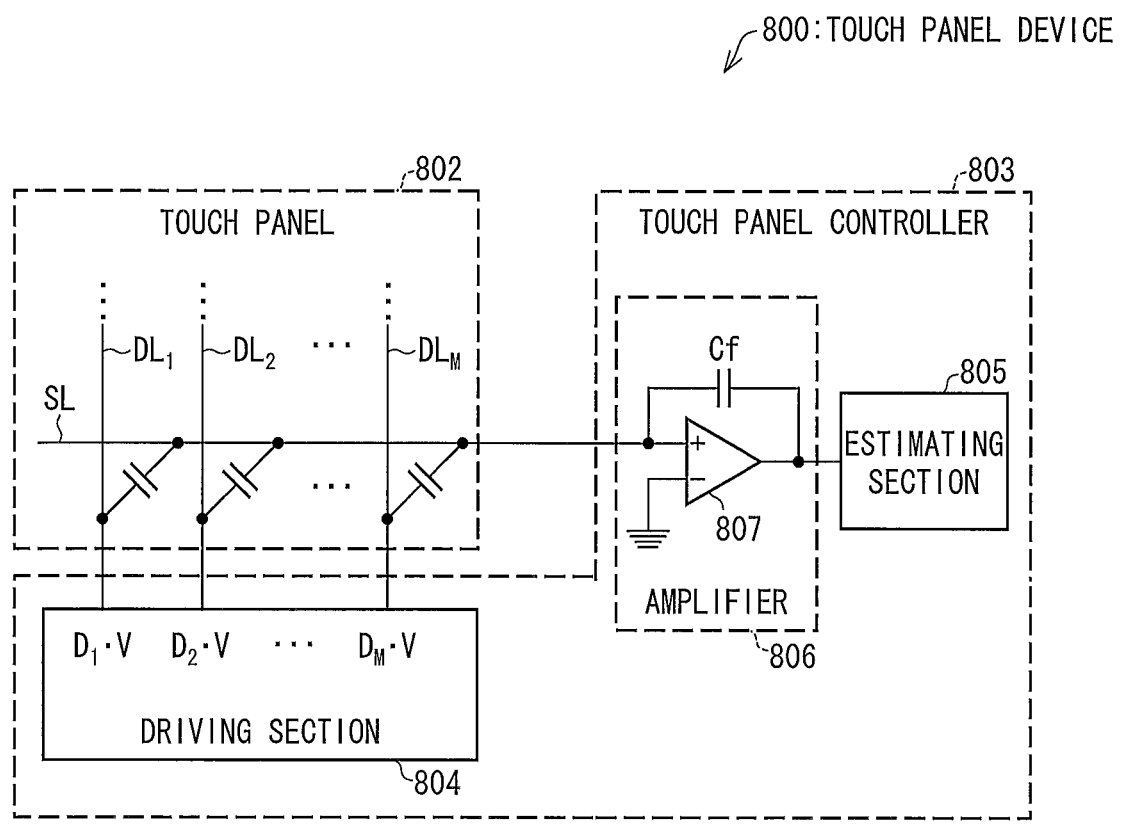

FIG. 12 is a view schematically illustrating a configuration of a touch panel system in accordance with a reference example of the preset invention.

Figure 13:
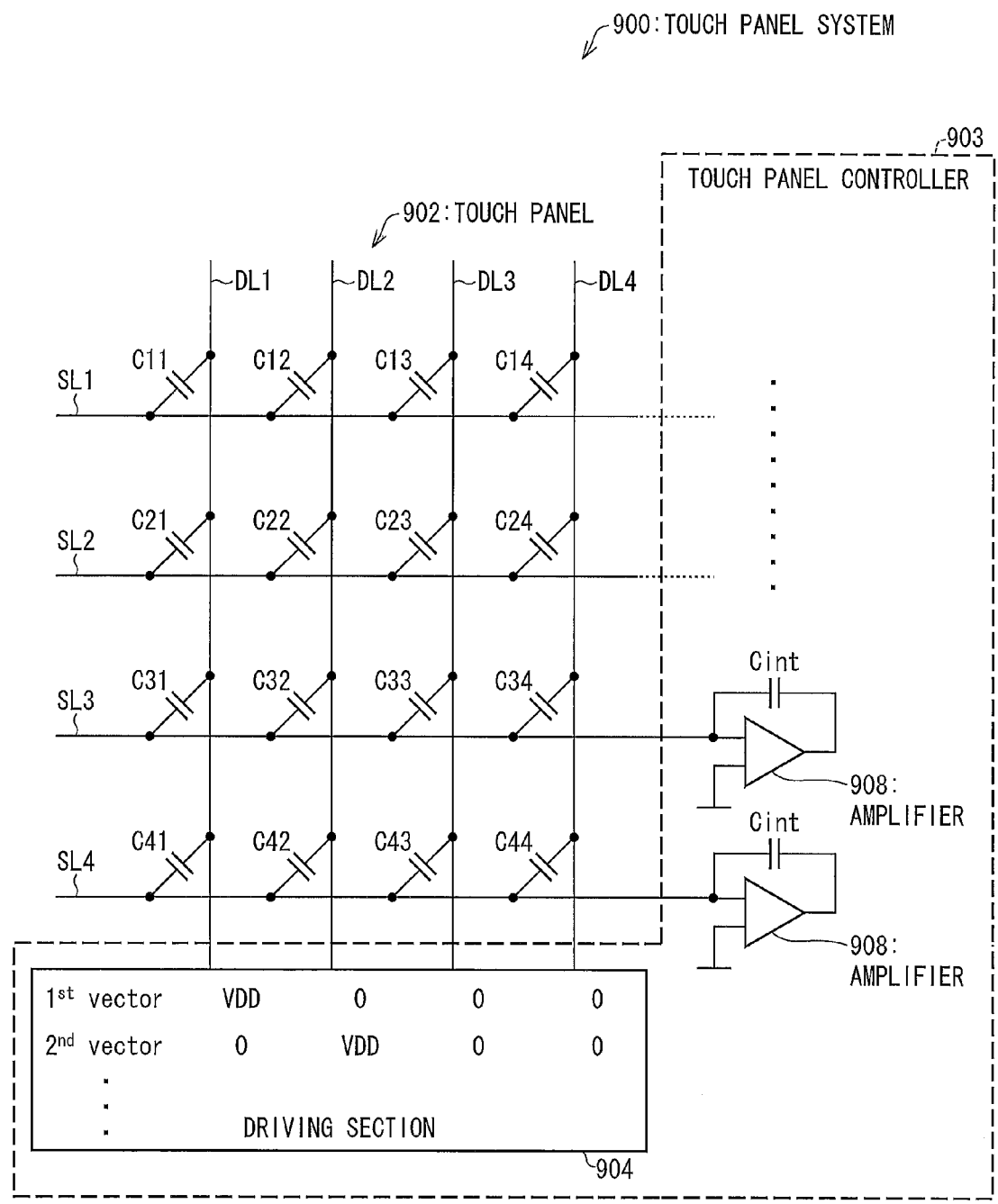

FIG. 13 is a view schematically illustrating a configuration of a conventional touch panel system.

FIG. 14 is a view illustrating a configuration of a code sequence for driving a touch panel system.

DESCRIPTION OF EMBODIMENTS

The following description will discuss, in detail, an example of the present invention with reference to FIGS. 1 through 12. Note that a size, a material, a shape, relative arrangement, and the like of each component described in each embodiment do not limit thereto the scope of the present invention and are merely illustrative, unless otherwise specifically described.

(Configuration on which Embodiments are Premised)

(Example of Linear System Coefficient Estimation Method; Touch Panel System 800)

FIG. 12 is a view schematically illustrating a configuration of a touch panel system 800 in accordance with a reference example of the preset invention.

The touch panel system 800 includes a touch panel 802 and a touch panel controller 803. The touch panel 802 has M drive lines DL1 through DLM and a plurality of sense lines. Note however that, for convenience, the touch panel 802 here will be described on the presumption that only one sense line SL is provided. Capacitors C1 through CM, whose capacitances are $C_1$ through $C_M$, respectively, are arranged at respective intersections of the drive lines DL1 through DLM and the sense SL.

The touch panel controller 803 includes a driving section 804. The driving section 804 simultaneously drives the drive lines DL1 through DLM. In a case where an element of a code sequence H is "1 (one)", the driving section 804 applies a voltage V to the drive lines DL1 through DLM. In a case where an element of the code sequence H is "−1 (minus one)", the driving section 804 applies a voltage −V to the drive lines DL1 through DLM.

The touch panel controller 803 includes an amplifier 806 whose position is arranged to correspond to the sense line SL. The amplifier 806 receives and amplifies linear sum signals $S_j$, via the sense line SL which is connected to the capacitors driven by the driving section 804. The linear sum signals $S_j$ are expressed by the following Expression 5.

$$S_j = \frac{-V \cdot \left(\sum_{i=1}^{M} D_{i,j} \cdot C_i\right)}{Cf} \quad \text{(Expression 5)}$$

where $D_{i,j}$ denotes N M-dimensional vectors. Target coefficients $A_k$ to be estimated are expressed as follows by calculating an inner product.

$$A_k = \frac{1}{N}\sum_{j=1}^{N} S_j \cdot D_{k,j} \quad \text{(Expression 6)}$$

In a case where the linear sum signals $S_j$ are substituted in Expression 6, the target coefficients $A_k$ are obtained as in the following expression.

$$A_k = \frac{-V}{N \cdot Cf} \sum_{j=1}^{N}\left(\sum_{i=1}^{M} D_{i,j} \cdot C_i\right) \cdot D_{k,j} \quad \text{(Expression 7)}$$

Here, assuming that the vectors $D_{i,j}$ (i=1, ..., M; j=1, ... N) are orthogonal to each other, an inner product of identical vectors is 1 (one), whereas an inner product of different vectors is 0 (zero). Therefore, the following expression is obtained.

$$A_k = \frac{-V}{Cf}C_k \quad \text{(Expression 8)}$$

where k=1, ..., M.

In a case where noise $No_j$ is superimposed on the sense line, the linear sums $S_j$ are as follows:

$$S_j = \frac{-V \cdot \left(\sum_{i=1}^{M} D_{i,j} \cdot C_i\right)}{Cf} + No_j \quad \text{(Expression 9)}$$

Furthermore, the target coefficients $A_k$ estimated by calculating the inner product are as follows.

$$A_k = \frac{-V}{N \cdot Cf} \sum_{j=1}^{N}\left(\sum_{i=1}^{M} D_{i,j} \cdot C_i\right) \cdot D_{k,j} + \frac{1}{N}\sum_{j=1}^{N} No_j \cdot D_{k,j} \quad \text{(Expression 10)}$$

Due to the orthogonal condition of the vectors $D_{i,j}$, $$A_k = \frac{-V}{Cf}C_k + \frac{1}{N}\sum_{j=1}^{N} No_j \cdot D_{k,j} \quad \text{(Expression 11)}$$

the target coefficients $A_k$ are thus derived.

A method of thus estimating and determining target coefficients by use of a linear calculation is referred to as a linear system coefficient estimation method.

According to the linear system coefficient estimation method for the touch panel system 800, an error, which varies depending on an inner product of the noise $No_j$ and the vectors $D_{i,j}$, occurs in estimated values expressed as the target coefficients $A_k$ see the second term of a right side of Expression 11). The target coefficients $A_k$ are therefore easily affected by the noise. In other words, the target coefficients $A_k$ determined by the linear system coefficient estimation method have low noise-resistance. It follows that the touch panel system 800 has low noise-resistance.

Embodiment 1

Configuration of Touch Panel System 100

FIG. 1 illustrates a touch panel system 100 in accordance with the present invention.

The touch panel system 100 includes a touch panel 102 and a touch panel controller 103. The touch panel 102 has M drive lines DL1 through DLM and a sense line SL. Capacitors C1 through CM, whose capacitances are $C_1$ through $C_M$, respectively, are arranged at respective intersections of the drive lines DL1 through DLM and the sense line SL.

The touch panel controller 103 includes a driving section 104. The driving section 104 simultaneously drives the drive lines DL1 through DLM. In a case where an element of a code sequence H is "1 (one)", the driving section 104 applies a voltage V to the drive lines DL1 through DLM. In a case where an element is "−1 (minus one)", the driving section 104 applies a voltage −V to the drive lines DL1 through DLM.

The touch panel controller 103 includes an amplifier 106 whose position is arranged to correspond to the sense line SL. The amplifier 106 has an operational amplifier 107 and an integral capacitor Cf provided between a non-inverted input terminal of the operational amplifier 107 and an output of the operational amplifier 107. The amplifier 106 receives and amplifies linear sum signals, via the sense line SL which is connected to the capacitors driven by the driving section 104.

The touch panel system 100 has a configuration identical to that of the touch panel system 800 in accordance with the reference example illustrated in FIG. 12, except for part of the configuration. The touch panel system 100 is different from the touch panel system 800 in the following point. That is, the touch panel system 100 includes a filter 101 (noise removing section, discrete-time filter) between the amplifier 106 and an estimating section 105, whereas the touch panel system 800 includes no filter 101. Note that, according to Embodiment 1, the number of the sense line SL is 1 (one) (SL) and the number of the drive lines DL is 7 (DL1 through DL7).

The filter 101 is made up of (i) a delay device 108 which delays each linear sum signal received from the amplifier 106 and outputs a corresponding delayed linear sum signal and (ii) a subtracter 109 which subtracts, from the linear sum signal received from the amplifier 106, the corresponding delayed linear sum signal received from the delay device 108 and then supplies a subtracted result to the estimating section 105.

The estimating section 105 estimates values of M capacitances by calculating an inner product of (i) signals which vary in accordance with linear sum signals from each of which noise has been removed by the filter 101 and (ii) N M-dimensional vectors.

(Example Operation of Touch Panel System 100)

According to Embodiment 1, the capacitors, which are connected to the sense line, are driven with the use of an M sequence whose code length is 15. FIG. 2 illustrates an example of a code sequence MC, which is an M sequence whose code length is 15. According to Embodiment 1, since the number of the drive lines is 7, 7 of 15 sequences E1,j through E15,j (see FIG. 2) are used. The filter 101 of Embodiment 1 includes a block (the delay device 108) which delays a supplied signal by 1 (one) clock. Therefore, in a case where, for example, the sequence E1,j shown in FIG. 2 is used, it should be avoided to use at the same time, the sequence E2,j and the sequence E1,j, which is a signal obtained by delaying the sequence E2,j by 1 (one) clock. In view of the circumstances, the present example employs sequences Di,j expressed by Di,j=E2i−1,j (i=1, . . . , 7).

As described above, such 15 seven-dimensional vectors in accordance with Embodiment 1 are constituted by selecting seven code sequences (K<N), out of 15 code sequences in accordance with the code sequence MC which is an M-sequence whose code length is 15, so that no code sequence, obtained by delaying any one of the seven code sequences by a delay clock, is contained in the seven code sequences.

(a) of FIG. 3 illustrates a linear sum signal S1 on which noise has not yet been superimposed. (b) of FIG. 3 illustrates a signal S2 on which noise has been superimposed. (c) of FIG. 3 illustrates an output signal S3 of the filter 101. Each vertical axis represents normalized signal amplitude, whereas each horizontal axis represents time. As is clear from FIG. 3, the output signal S3 is lower in noise amplitude, as compared with the signal S2 on which the noise has been superimposed.

(a) of FIG. 4 illustrates a capacitance pattern P1 formed in the touch panel 102. (b) of FIG. 4 illustrates a capacitance pattern P2 estimated by the estimating section 105. A broken line indicates a capacitance pattern P3 observed in a case where no filter 101 of the present invention is used, A solid line indicates the capacitance pattern P2 estimated in a case where the filter 101 of the present invention is used. Each vertical axis represents normalized capacitances, whereas each horizontal axis represents numbers of the drive lines, to which the respective capacitors are provided. The capacitance pattern P2, observed in a case where the filter 101 is used, is an estimated pattern which is more similar to the input capacitance pattern P1 than the capacitance pattern P3 observed in a case where no filter 101 is used.

Note that the touch panel system 100 can employ, instead of the filter 101, a filter capable of changing a transfer function depending on a linear sum signal. In this case, it is possible to provide a touch panel system 100 which has high noise-resistance, by selecting a transfer function which allows noise to be most effectively attenuated.

(Linear System Coefficient Estimation Method of the Present Invention)

The following description will discuss an example of a linear system coefficient estimation method of the present invention, which method is for use in the touch panel system 100.

According to the touch panel system 100, noise is attenuated by filtering N linear sum signals of target coefficients, the N linear sum signals being obtained by simultaneously driving the target coefficients in accordance with N M-dimensional vectors. It is assumed that a transfer function Hn of the filter 101 used during the filtering is $1-z_1^{-1}$.

In a case where the filter 101 is applied to the linear sum signals expressed by the following expression, $$S_j = \frac{-V \cdot \left( \sum_{i=1}^{M} D_{i,j} \cdot C_i \right)}{Cf} + No_j \quad \text{(Expression 12)}$$

where $C_i$ (l=1, . . . , M) denotes capacitances, $$So_j = \frac{-V \cdot \left(\sum_{i=1}^{M} D_{i,j} \cdot C_i\right)}{Cf} - \frac{-V \cdot \left(\sum_{i=1}^{M} D_{i,j-1} \cdot C_i\right)}{Cf} + No_j - No_{j-1}$$ (Expression 13)

the above expression is obtained. In a case where a frequency of a noise signal is low in Expression 13, $No_j - No_{j-1}$ is nearly equal to 0 (zero). This clearly shows that noise can be reduced.

Note, however, that the second term of a right side of Expression 13 contains $D_{i,j-1}$. In a case where an M-sequence which can be easily implemented as hardware is used as the M-dimensional vectors $D_{i,j}$, a vector obtained by delaying any vector by 1 (one) clock becomes a different vector. Here, it is expressed that the $D_{i,j-1} = D_{i+1,j}$. In a case where is substituted in the second term of the right side of Expression 13, $So_j$ are as follows.

$$So_j = \frac{-V \cdot \left(\sum_{i=1}^{M} D_{i,j} \cdot C_i\right)}{Cf} - \frac{-V \cdot \left(\sum_{i=1}^{M} D_{i+1,j} \cdot C_i\right)}{Cf} + No_j - No_{j-1}$$ (Expression 14)

In this case, assuming that the noise has been almost vanished, target coefficients $A_k$ estimated by use calculation of an inner product are expressed as follows from Expression 6 and Expression 14.

$$A_k = \frac{-V}{N \cdot Cf} \sum_{j=1}^{N} \left(\sum_{i=1}^{M} D_{i,j} \cdot C_i\right) \cdot D_{k,j} - \frac{-V}{N \cdot Cf} \sum_{j=1}^{N} \left(\sum_{i=1}^{M} D_{i+1,j} \cdot C_i\right) \cdot D_{k,j}$$ (Expression 15)

Here, it is assumed that an inner product of different vectors is so small as to be ignored. In this case, the following expression is obtained.

$$A_k = \frac{-V}{Cf} C_k - \frac{-V}{Cf} C_{k-1}$$ (Expression 16)

In this case, each of the target coefficients $A_k$ is a difference between adjacent coefficients $C_k$ and $C_{k-1}$.

$$B_k A_k = A_{k-1}$$ (Expression 17)

In this regard, by calculating coefficients $B_k$, it is possible to estimate $C_k$.

Alternatively, it is possible to estimate $C_k$ with the use of no vector which is obtained by delaying any vector by 1 (one) clock. For example, in a case where (i) an M-sequence $E_{i,j}$ which is 2N M-dimensional vectors is prepared and (ii) it is defined that $E_{2i,j} = D_{i,j}$.

$$So_j = \frac{-V \cdot \left(\sum_{i=1}^{M} D_{i,j} \cdot C_i\right)}{Cf} - \frac{-V \cdot \left(\sum_{i=1}^{M} D_{i+1,j} \cdot C_i\right)}{Cf} + No_j - No_{j-1}$$ (Expression 18)

the above expression becomes the following expression.

$$So_j = \frac{-V \cdot \left(\sum_{i=1}^{M} E_{2i,j} \cdot C_i\right)}{Cf} - \frac{-V \cdot \left(\sum_{i=1}^{M} E_{2i+1,j} \cdot C_i\right)}{Cf} + No_j - No_{j-1}$$ (Expression 19)

Therefore, in a case where the noise has been almost vanished, the target coefficients $A_k$ estimated by use of calculation of an inner product are as follows from Expression 2 and Expression 19.

$$A_k = \frac{-V}{N \cdot Cf} \sum_{j=1}^{N} \left(\sum_{i=1}^{M} E_{2i,j} \cdot C_i\right) \cdot D_{k,j} - \frac{-V}{N \cdot Cf} \sum_{j=1}^{N} \left(\sum_{i=1}^{M} E_{2i+1,j} \cdot C_i\right) \cdot D_{k,j}$$ (Expression 20)

Since it is defined that $D_{i,j} = D_{i,j}$ do not contain $E_{2i+1}$ ($D_{i,j}$ are different from $E_{2i+1}$). Therefore, assuming that an inner product of difference vectors is so small as to be ignored, $$A_k = \frac{-V}{Cf} C_k$$ (Expression 21)

the above expression is obtained.

According to the linear system coefficient estimation method of Embodiment 1, the expression, which expresses estimated target coefficients $A_k$, contains no noise $No_j$. This causes the target coefficients $A_k$ not to be affected by the noise $No_j$.

Therefore, according to the linear system coefficient estimation method of Embodiment 1, since it is possible to reduce noise, it is possible to provide a touch panel system 100 which has high noise-resistance.

Embodiment 2

With reference to FIGS. 5 through 10, the following description will discuss a filter 200 and a filter 2000 (adaptive filter) each of which is capable of changing a coefficient, as other examples of the filter for use in an integrated circuit, a touch panel system, or an electronic apparatus of the present invention.

(a) and (b) of FIG. 7 illustrate an example of a signal which is observed in a case where the filter for use in an integrated circuit, a touch panel system, or an electronic apparatus is arranged not to be capable of changing a coefficient and in which a characteristic of noise is changed from any characteristic to another different characteristic. (a) of FIG. 7 illustrates a linear sum signal S4 to which noise, whose characteristic has been changed, has not yet been applied. (b) of FIG. 7 illustrates a signal S5 to which noise, whose characteristic has been changed, has been applied. Furthermore, (c) of FIG. 7 illustrates a signal 86 obtained by filtering the signal S5 with the use of a noise filter whose coefficient cannot be changed. As is clear from (c) of FIG. 7, the noise filter cannot attenuate the noise after the characteristic of the noise is changed.

Example 1 of Adaptive Filter

FIG. 5 is a view schematically illustrating a configuration of a touch panel system 100a, employing a filter 200, of the present invention. The touch panel system 100a is different from the touch panel system 100 in the following point. That is, the touch panel system 100a includes a touch panel controller 103a which includes the filter 200 that is different from the filter 100. FIG. 6 is a view schematically illustrating a configuration of the filter 200. The filter 200 is made up of a delay element 201, a variable gain section 202, a coefficient calculating section 203, and a subtracting section 204 which subtracts, from an input signal, a signal received from the variable gain section 202. The coefficient calculating section 203 calculates a correlation between an input signal of the filter 200 and an output signal of the delay element 201. In a case where the correlation is positive, the coefficient calculating section 203 outputs 1 (one). In a case where the correlation is negative, the coefficient calculating section 203 outputs −1 (minus one). The variable gain section 202 has gain of 1 (one), in a case where an output signal of the coefficient calculating section 203 is 1 (one) with respect to the output signal of the delay element 201. Alternatively, the variable gain section 202 has gain of −1 (minus one), in a case where the output signal of the coefficient calculating section 203 is −1 (minus one) with respect to the output signal of the delay element 201.

(d) of FIG. 7 illustrates a signal S7 obtained by filtering the signal 85 illustrated in (b) of FIG. 7 with the use of the filter 200. (e) of FIG. 7 illustrates an output signal 88 of the coefficient calculating section 203. As is clear from (d) and (e) of FIG. 7, the noise can be attenuated with the use of the filter 200 even after the characteristic of the noise is changed.

(a) of FIG. 8 illustrates a capacitance pattern P4 formed in a touch panel 102. (b) of FIG. 8 illustrates a capacitance pattern P5 estimated by an estimating section 105 in a case where the capacitance P4 is supplied to the touch panel controller 103a. According to (b) of FIG. 8, a dotted line indicates a capacitance pattern P6 estimated in a case where no filter of the present invention is used. A solid line indicates a capacitance pattern P5 estimated in a case where the filter 200 is used. Each vertical axis represents normalized capacitances, whereas each horizontal axis represents numbers of drive lines to which capacitors are provided. With the use of the filter 200, the estimated capacitance pattern P5 is obtained which is more similar to the capacitance pattern P4 formed in the touch panel 102.

As described above, even in a case where a characteristic of noise has been changed, it is possible to attenuate the noise with the use of the filter 200 which is capable of changing a coefficient.

Example 2 of Adaptive Filter

FIG. 9 is a view schematically illustrating a configuration of a touch panel system 100b of Embodiment 2, which touch panel system 100b includes a touch panel controller 103b including a filter 2000. FIG. 10 illustrates the filter 2000 as another example of the filter capable of changing a coefficient. Note that identical reference numbers are given to components identical to those described above. Therefore, the components will not be described in detail here.

FIGS. 1 and 6 each illustrate an example of a filter arranged to use one delay element corresponding to 1 (one) clock. In contrast, the filter 2000 is arranged to use a plurality of delay elements 201.

The filter 2000 is an FIR (Finite Impulse Response) filter made up of N delay elements 201 and an adding section 204. The filter 2000 is arranged such that an input signal is delayed by i (i=0, ..., N) clocks, then resulting signals are weighed with weights $a_i$ by the variable gain section 202, and then the signals thus weighed are added and outputted by the adding section 204. By adaptively changing the weights $a_i$, it is possible to select a transfer function which allows noise to be most effectively attenuated. Accordingly, it is possible to provide an apparatus which has high noise-resistance, even in a case where a characteristic of noise has been changed.

Note that, according to Embodiment 2, the coefficient of the filter is 1 or −1. However, the coefficient can be other values. Note also that, according to the present example, the coefficient of the filter is determined by a correlation calculation of signals but is not limited to such. Alternatively, the coefficient can be determined by another method such as an LMS method.

Embodiment 3

The following description will discuss, with reference to FIG. 11, a mobile phone 300 as an example of an electronic apparatus employing a touch panel which is controlled by an integrated circuit of the present invention.

FIG. 11 is a functional block diagram illustrating a configuration of the mobile phone 300 in accordance with Embodiment 3. The mobile phone 300 includes a CPU 310, a RAM 312, a ROM 311, a camera 313, a microphone 314, a speaker 315, an operation key 316, a display panel 318, a display control circuit 309, and a touch panel system 301. Those components are connected to one another via a data bus.

The CPU 310 controls operation of the mobile phone 300. The CPU 310 executes a program stored, for example, in the ROM 311. Via the operation key 316, an instruction is entered by a user with respect to the mobile phone 300. The RAM 312 is a volatile memory which stores data generated by the CPU 310 executing the program or data entered via the operation key 316. The ROM 311 is a non-volatile memory which stores data.

The ROM 311 is a writable and erasable ROM such as EPROM (Erasable programmable Read-Only Memory) and a flash memory. The mobile phone 300 can be arranged to include an interface (IF) (not illustrated in FIG. 11) via which the mobile phone 300 is connected to other electronic apparatus by wire.

The camera 313 captures a subject in response to an operation conducted by the user via the operation key 316. Note that image data of the subject captured is stored in the RAM 312 or an external memory (for example, a memory card). The microphone 314 receives an input of a sound of the user. The mobile phone 300 digitalizes the sound inputted (analog data), and then transmits the sound thus digitalized to other device with which the mobile phone 300 is in communication (for example, other mobile phone). The speaker 315 outputs, for example, a sound in accordance with music data stored in the RAM 312.

The touch panel system 301 includes a touch panel 302 and a touch panel controller 303. The CPU 310 controls operation of the touch panel system 301. The CPU 310 executes a program stored, for example, in the ROM 311. The RAM 312 is a volatile memory which stores data generated by the CPU 310 executing the program. The ROM 311 is a nonvolatile memory which stores data.

The display control circuit 309 causes the display panel 318 to display an image stored in the ROM 311 or the RAM 312. The display panel 318 is superimposed on the touch panel 302 or embeds therein the touch panel 302.

The present invention is not limited to the description of the embodiments, but may be altered by a person skilled in the art within the scope of the claims. An embodiment derived from a proper combination of technical means disclosed in different embodiments is also encompassed in the technical scope of the present invention.

A linear system coefficient estimation method of the present invention is a linear system coefficient estimation method in which values of M target coefficients are estimated by (i) obtaining N linear sums of the M target coefficients by simultaneously driving the M target coefficients in accordance with N M-dimensional vectors and (ii) calculating an inner product of N linear sum signals, which correspond to the respective N linear sums, of the M target coefficients and the N M-dimensional vectors, the method including the steps of: (a) removing noise superimposed on each of the N linear sum signals of the M target coefficients by filtering the N linear sum signals; and (b) estimating the values of the M target coefficients by calculating the inner product of (i) signals which vary in accordance with the N linear sum signals from each of which the noise has been removed in the step (a) and (ii) the N M-dimensional vectors.

The linear system coefficient estimation method of the present invention is preferably arranged such that, in the step (a), the N linear sum signals are filtered with the use of a discrete-time filter.

According to the above configuration, the filter used during the noise removing step is a discrete-time filter.

Therefore, it is possible to easily make up the filter used during the filtering from, as main components, one or more delay element(s) and one or more adder(s).

The linear system coefficient estimation method of the present invention is preferably arranged such that the N M-dimensional vectors are constituted by selecting K code sequences (K<N), out of N code sequences in accordance with an M-sequence whose code length is N, so that no code sequence which is distant, by a delay clock, from any one of the K code sequences is contained in the K code sequences.

In a case where the N M-dimensional vectors are constituted by an M-sequence which can be easily implemented as hardware, a vector D2 obtained by delaying, by a delay clock, any M-dimensional vector D1 included in the N M-dimensional vectors is also included in the N M-dimensional vectors. In a case where the target coefficients are estimated by calculation of linear sum signals including the vectors D1 and D2, the calculation may be complicated depending on the relationship between the vectors D1 and D2.

However, according to the above configuration, no code sequence, obtained by delaying, by a delay clock, any code sequence included in the K M-dimensional vectors, is contained in the K M-dimensional vectors which are constituted by being selected out of the N code sequences in accordance with the M-sequence whose code length is N.

Therefore, the calculation for estimating the target coefficients is not complicated.

The linear system coefficient estimation method of the present invention is preferably arranged such that, in the step (a), the N linear sum signals are filtered with the use of an adaptive filter.

According to the above configuration, the adaptive filter self-adapts a transfer function depending on the N linear sum signals inputted.

Therefore, even in a case where the noise has changed which is superimposed on each of the linear sum signals inputted, each of the linear sum signals is filtered by a filter most suitable to the noise which has changed. It is accordingly possible to most suitably remove the noise.

Furthermore, according to the above configuration, even in a case where a characteristic of the noise has changed, it is possible to select a transfer function which allows the noise to be most effectively attenuated. It is therefore possible to provide a linear system coefficient estimation method which has high noise-resistance.

An integrated circuit of the present invention is an integrated circuit including: a driving section which simultaneously drives M target coefficients in accordance with N M-dimensional vectors; and an estimating section which estimates values of the M target coefficients by (i) obtaining N linear sums of the M target coefficients and (ii) calculating an inner product of N linear sum signals, which correspond to the respective N linear sums, of the M target coefficients and the N M-dimensional vectors, the integrated circuit further including: a noise removing section for removing noise superimposed on each of the N linear sum signals of the M target coefficients by filtering the N linear sum signals, the estimating section estimating the values of the M target coefficients by calculating the inner product of (i) signals which vary in accordance with the N linear sum signals from each of which the noise has been removed by the noise removing section and (ii) the N M-dimensional vectors.

The integrated circuit of the present invention is preferably arranged such that the noise removing section includes a discrete-time filter.

According to the above configuration, it is possible to make up the noise removing section from, as main components, one or more delay element(s) and one or more adder(s).

The integrated circuit of the present invention is preferably arranged such that the N M-dimensional vectors are constituted by selecting K code sequences (K<N), out of N code sequences in accordance with an M-sequence whose code length is N, so that no code sequence, obtained by delaying any one of the K code sequences by a delay clock, is contained in the K code sequences.

According to the above configuration, no code sequence, obtained by delaying, by a delay clock, any code sequence included in the K M-dimensional vectors, is contained in the K M-dimensional vectors which are constituted by being selected, by an M-dimensional constituting section, out of the N code sequences in accordance with the M-sequence whose code length is N.

Therefore, the calculation for estimating the target coefficients is not complicated.

The integrated circuit of the present invention is preferably arranged such that the noise removing section includes an adaptive filter.

According to the above configuration, the adaptive filter included in the noise removing section self-adapts a transfer function depending on the linear sum signals inputted.

Therefore, even in a case where the noise has changed which is superimposed on each of the linear sum signals inputted, the noise removing section filters the linear sum signals with the use of a filter most suitable to the noise which has changed. It is therefore possible to most suitably remove the noise.

INDUSTRIAL APPLICABILITY

The present invention is applicable to a linear system coefficient estimation method for estimating or detecting capacitances of capacitors arranged in a matrix pattern. Further, the present invention is applicable to an integrated circuit, a touch panel system, and an electronic apparatus, each of which employs the linear system coefficient estimation method.

REFERENCE SIGNS LIST 100, 301 Touch panel system
101 Filter (noise removing section, discrete-time filter)
103, 303 Touch panel controller integrated circuit)
104 Driving section
105 Estimating section
106 Amplifier
107 Operational amplifier
200 Filter (noise removing section, adaptive filter)
201 Delay element
202 Variable gain section
203 Coefficient calculating section
300 Mobile phone (electronic apparatus)
302 Touch panel
309 Display control circuit
310 CPU
311 ROM
312 RAM
313 Camera
314 Microphone
315 Speaker
316 Operation key
318 Display panel
2000 Filter (noise removing section, discrete-time filter, adaptive filter)
MC Code sequence which is an M-sequence
S1 through S8 Signals
P1 through P3 Capacitance patterns

The invention claimed is:

1. A linear system coefficient estimation method in which values of M target coefficients are estimated by (i) obtaining N linear sums of the M target coefficients by spontaneously driving the M target coefficients in accordance with N M-dimensional vectors and (ii) calculating an inner product of N linear sum signals, which correspond to the respective N linear sums, of the M target coefficients and the N M-dimensional vectors, the method comprising the steps of:

(a) removing noise superimposed on each of the N linear sum signals of the M target coefficients by filtering the N linear sum signals; and
(b) estimating the values of the M target coefficients by calculating the inner product of (i) signals which vary in accordance with the N linear sum signals from each of which the noise has been removed in the step (a) and (ii) the N M-dimensional vectors,
wherein, in the step (a), the N linear sum signals are filtered with the use of a discrete-time filter; and
the N M-dimensional vectors are constituted by selecting K code sequences (K<N), out of N code sequences in accordance with an M-sequence whose code length is N, so that no code sequence, obtained by delaying any one of the K code sequences by a delay clock, is contained in the K code sequences.

2. An integrated circuit including: a driving section which spontaneously drives M target coefficients in accordance with N M-dimensional vectors; and an estimating section which estimates values of the M target coefficients by (i) obtaining N linear sums of the M target coefficients and (ii) calculating an inner product of N linear sum signals, which correspond to the respective N linear sums, of the M target coefficients and the N M-dimensional vectors, the integrated circuit further comprising:

a noise removing section for removing noise superimposed on each of the N linear sum signals of the M target coefficients by filtering the N linear sum signals,
the estimating section estimating the values of the M target coefficients by calculating the inner product of (i) signals which vary in accordance with the N linear sum signals from each of which the noise has been removed by the noise removing section and (ii) the N M-dimensional vectors,
wherein the noise removing section includes a discrete-time filter; and
the N M-dimensional vectors are constituted by selecting K code sequences (K<N), out of N code sequences in accordance with an M-sequence whose code length is N, so that no code sequence, obtained by delaying any one of the K code sequences by a delay clock, is contained in the K code sequences.

3. A touch panel system, comprising:
an integrated circuit recited in claim 2; and
a touch panel which is controlled by the integrated circuit.

4. An electronic apparatus, comprising:
an integrated circuit recited in claims 2;
a touch panel which is controlled by the integrated circuit; and
a display panel which is superimposed on the touch panel or which embeds therein the touch panel.

* * * * *